United States Patent
Martin

[11] 3,916,510
[45] Nov. 4, 1975

[54] METHOD FOR FABRICATING HIGH EFFICIENCY SEMI-PLANAR ELECTRO-OPTIC MODULATORS

[75] Inventor: William E. Martin, San Diego, Calif.

[73] Assignee: The United States of America as represented by the Secretary of the Navy, Washington, D.C.

[22] Filed: July 1, 1974

[21] Appl. No.: 484,484

[52] U.S. Cl. .................... 29/583; 357/60; 148/175; 148/188
[51] Int. Cl.² .......................................... B01J 17/00
[58] Field of Search ......... 29/583; 357/60; 148/188, 148/189, 175

[56] References Cited
UNITED STATES PATENTS

| | | | |
|---|---|---|---|
| 3,247,576 | 4/1966 | Dill ...................................... | 29/583 |
| 3,535,773 | 10/1970 | Bakker................................. | 29/583 |
| 3,544,468 | 12/1970 | Catano................................ | 148/188 |
| 3,723,177 | 3/1973 | Toyama .............................. | 148/189 |
| 3,815,223 | 6/1974 | Allison................................. | 29/583 |

Primary Examiner—W. Tupman
Attorney, Agent, or Firm—R. S. Sciascia; G. J. Rubens; J. W. McLaren

[57] ABSTRACT

High efficiency semi-planar electro-optic modulators are fabricated by depositing an electro-optic epitaxial waveguiding layer on a low resistivity single crystal substrate and then depositing first and second electrodes on opposite sides of the composition. After the natural cleavage plane of the substrate material has been determined, the composite material is aligned in a suitable scribing means and the substrate is scribed parallel to its natural cleavage plane along two widely spaced parallel lines defining the entrance and exit faces of a plurality of modulators; then the composite material is scribed with multiple closely spaced parallel lines at 90° to the previously scribed widely spaced parallel lines, for cleaving the composite material in situ completing the formation of a plurality of the desired modulators. The cleaved side surfaces of the modulators confine light energy to the waveguide portion. If desired, an optical buffer layer may be deposited on the substrate before deposition of the waveguiding material to minimize optical losses.

10 Claims, 2 Drawing Figures

METHOD FOR FABRICATING HIGH EFFICIENCY SEMI-PLANAR ELECTRO-OPTIC MODULATORS

BACKGROUND OF THE INVENTION

Bulk crystal electro optic modulation with modulators having thicknesses of the order of 100 microns or greater has been well known for many years. However, guided wave modulators have been demonstrated to be feasible only relatively recently. Modulation of the phase or amplitude of light in an optical waveguide is one of the primary requirements of material suitable for fabrication of integrated optical circuit components. Planar electro-optical waveguide modulators in III–IV compounds have been demonstrated as disclosed by F. K. Reinhart in an article appearing in the Journal of Applied Physics, Volume 39 at page 3426, by D. Hall A. Yariv and E. Garmire in an article appearing in Optical Communications, Volume 1, page 403 and also by F. K. Reinhart and B. I. Miller in an article appearing in Applied Physics Letters, Volume 20, page 36. Waveguide modulation in nitrobenzene has recently been demonstrated to be feasible as disclosed in an article by J. N. Polky and J. H. Harris which appeared in Applied Physics Letters, Volume 7, page 307.

Optical waveguides produced by diffusion in II VI compounds have been described previously in an article by H. F. Taylor, W. E. Martin, D. P. Hall and V. N. Smiley titled "Fabrication of Single-Crystal Semiconductor Optical Waveguides by Solid-State Diffusion" which appeared in Applied Physics Letters, Volume 21, beginning at page 95 and also an article by W. E. Martin and D. B. Hall titled "Optical Waveguides by Diffusion in II VI Compounds" which appeared in Applied Physics Letters, Volume 21, beginning at page 325.

The addition of suitable electrodes to these crystal materials can produce refractive index changes which modulate the phase of the transmitted light and efficient phase amplitude modulation can thus be accomplished. Fabrication of waveguide modulators by diffusion can be accomplished with conventional photoresist technology which produces guides with relatively very low losses, i.e., less than three db per centimeter. In waveguide modulators the electric field can be very large for moderate applied voltages since the modulator dimensions are relatively small; that is, of the order of less than 20 microns.

Multi-mode planar waveguide electro-optic modulators of the type disclosed by the inventor herein in an article which appeared in the Journal of Applied Physics, Volume 44, No. 8, August 1973 appearing beginning at page 3703 require much less power to operate due to their relatively small size with a consequent desirable reduction in capacitance and confinement of the optical beam to a relatively small region. Most importantly, in addition the consequent reduction in capacitance permits significantly higher speed operation in their use as modulators. This disclosure describes electro-optical modulation in three dimensional optical waveguides fabricated by diffusion in ZnSe and CdS. Additionally, electro-optical modulation in planar leaky mode waveguides of ZnSe and ZnS epitaxy on GaAs was reported.

Accordingly, it is highly desirable that a method and process be provided for the rapid, reliable, and relatively inexpensive fabrication of such modulators.

SUMMARY OF THE INVENTION

The present invention relates to a method for fabricating high efficiency semi-planar electro-optic modulators. The method and process of the present invention comprises the steps of depositing an electro-optic epitaxial waveguiding layer on a low resistivity single crystal substrate. Then an optical buffer material may be deposited on top of the epitaxial waveguiding material, if desired, though it is not an absolute essential in every case of practicing the present invention. First and second electrodes are then deposited on opposite sides so that one electrode is on the bottom of the substrate material while the other electrode may be on top of the optical buffer material.

Conventional x-ray diffraction techniques may be employed to orient the composite material relative to the internal crystal axes of the substrate. The natural cleavage plane of the substrate may be determined conveniently by mechanical fracture of an edge, for instance. The composite material is then aligned in a scribing means such as a laser, saw, or diamond and scribed along the natural cleavage plane of the substrate for cleaving the composite material in situ along two widely spaced parallel lines which define the entrance and exit faces of a plurality of the modulators being fabricated.

The scribing means is then repositioned relative to the composite material so that the substrate is scribed with multiple closely spaced parallel lines at 90° to the widely spaced parallel lines for cleaving the composite material in situ and completing the formation of a plurality of the desired modulators.

It has been found preferable that certain substrates be of the order of approximately 10 mils in thickness and it may be necessary after the deposition of the epitaxial waveguide layers on the single crystal substrate to thin the back of the substrate using a suitable mechanical or chemical process to achieve a thickness of the composite material which will permit it to cleave in situ without manipulation.

Accordingly, it is a primary object of the present invention to provide a method of fabrication of high efficiency semi-planar electro-optic modulators which can be performed with relative ease as well as inherently permitting the manufacture of such modulators at relatively low cost.

A concomitant and most important object of the present invention is to provide a method of fabricating such modulators which are small in size and characterized by a commensurately smaller capacitive value affording a consequent relative increase in the maximum operative modulation frequency.

An ancillary object of the present invention is a method of fabricating such small size modulators for compatibility in physical dimensions with companion optical devices such as diode lasers, light emitting diodes, and multi-mode fiber optics, for example.

A further object of the present invention is to provide a method for fabricating such modulators which may be practiced using a wide variety of different materials.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENT

Figure 1:
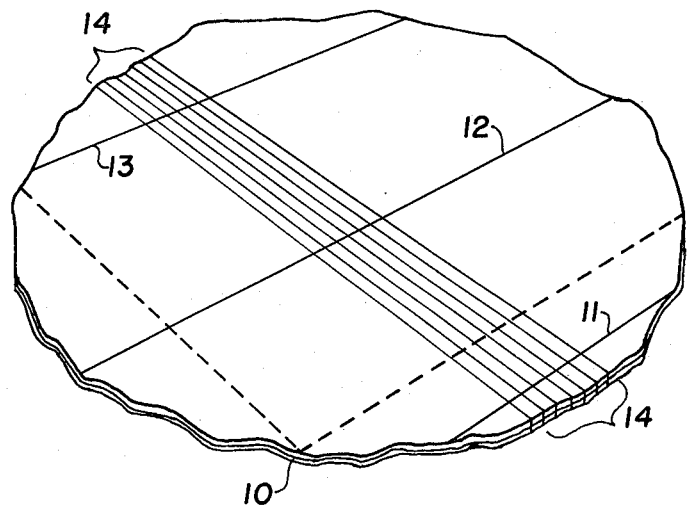
FIG. 1 is an illustration of the composite material as may be employed in the practice of the present invention.

In accordance with the concept and teaching of the present invention, a single crystal substrate material is selected for having low resistivity. The substrate is also selected to have suitable cleavable characteristics, i.e., it is desired that the selected single crystal substrate exhibit the property of cleaving along a known and determinable axis when it is scribed by a suitable means. Typical of such suitable substrates are GaAs of low resistivity which is commercially available in a composite form including planar epitaxial layers of such materials as ZnS and ZnSe. Leaky mode waveguiding will take place in such material as described by D. B. Hall and C. Yeh in the Journal of Applied Physics, Volume 44, beginning at page 2271 and for a large epitaxial layer thicknesses, i.e., of the order of more than 10 microns, very low loss of considerably less than 3db per centimeter waveguiding may be readily achieved. The ZnSe-GaAs composite material is particularly well suited for large area substrates since the lattice mismatch between the epitaxial layer and substrate is very low, being of the order of approximately one-half of one percent.

For the fabrication of modulators in accordance with the concept and teaching of the present invention, an ohmic contact type of electrode is formed on the bottom of the low resistivity GaAs substrate with In-Hg amalgum alloyed at 400°C in hydrogen.

A 1000 A thick layer of $SiO_2$ is then deposited on the top of the substrate over the waveguide material by RF sputtering. The $SiO_2$ serves as an optical buffer providing a low index region to prevent waveguide losses due to the metal electrode on the top of the waveguide. The next step is the deposit of aluminum top electrodes.

By x-ray diffraction techniques the composite material may be oriented as to the internal crystal axes of the substrate. The natural cleavage plane of the substrate material may then be determined by mechanical fracture of a convenient edge. Then the composite material is aligned in a scribing means and the substrate scribed along two widely spaced parallel lines for cleaving the composite material in situ. The resultant cleavage of the composite material defines the exit and entrance faces of a plurality of modulators.

A final step in the fabrication involves scribing multiple closely spaced parallel lines on the substrate of 90° to the previously scribed widely spaced parallel lines for cleaving the composite material in situ and completing formation of a plurality of modulators.

Using a diamond scriber, for example, a satisfactory yield may be produced of modulators approximately 3 mils wide and 1 centimeter long. Within the purview of the present invention however, other means may be employed to perform the scribing steps of the present invention and higher yields are possible with saw or laser scribing as contrasted to a diamond scriber.

Additional final steps in the process may include bonding wires for electrical connections to the top and bottom electrodes, followed by suitable packaging.

Thus, it may be seen that the method and process of the present invention provides a high performance unit at relatively low cost; moreover, small physical sizes may be achieved which provide commensurately smaller capacitive values and resultant higher modulation frequency operation several orders faster than functionally similar prior art devices. Desirably the smaller physical sizes are also compatible with the size of diode laser devices, light emitting diodes, and multimode fiber optics so that modulators produced by the present invention may be incorporated readily in low cost highly reliable optical data transmission systems employing such small elements.

FIG. 1 illustrates a composite material of the type which may lend itself to the practice of the method of the present invention. A suitable substrate material with a planar waveguiding layer thereon is shown at 10. The natural cleavage planes of the substrate are indicated by the dotted lines shown in substantially right angular disposition. The manner in which the bottom of the substrate is scribed initially along widely spaced parallel lines is indicated at 11, 12, and 13. The widely spaced parallel scribes define the entrance and exit faces of each of a plurality of modulators which may be fabricated out of the single piece of composite material such as is illustrated in FIG. 1.

After the widely spaced parallel scribes 11, 12, and 13 have been made, the composite material 10 may be turned or otherwise reoriented so as to facilitate further scribing at a 90° angle to the initial scribes 11, 12, and 13. The subsequent scribing is accomplished at multiple closely spaced parallel lines 14 which, it should be noted, are parallel to one of the natural cleavage planes of the substrate and at right angular disposition to the initial scribes 11, 12, 13. The composite material is cleaved in situ, completing the formation of a plurality of modulators commensurate with the number of such scribes permitted by the size of the composite material 10.

Figure 2:
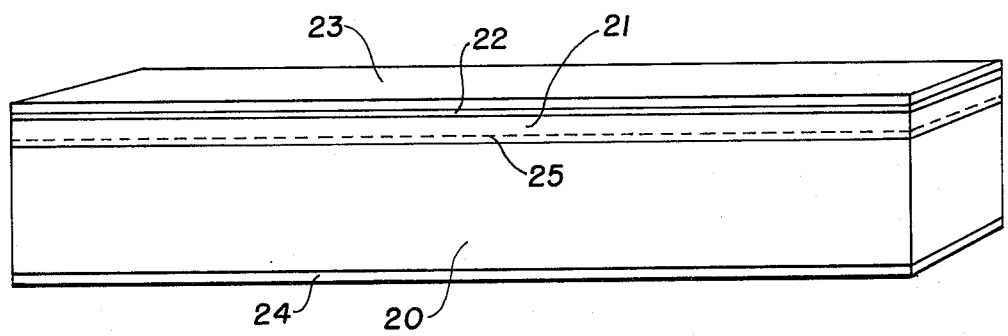
FIG. 2 is an illustration of a modulator fabricated by the method of the present invention.

As a result of carrying out the steps of fabrication as outlined hereinbefore, the plurality of high efficiency semiplanar electro-optic modulators is produced, each of which may be substantially in the form illustrated in FIG. 2. A low resistivity substrate material 20 supports an epitaxial electro-optic waveguide layer 21 on its top. Overlaying the epitaxial electro-optic waveguide layer 21 a suitable optical buffer layer may be employed as shown at 22, though such layer is not an absolute essential to all embodiments of modulators produced by the process and method of the present invention.

A top electrode 23 of suitable electrically conductive material is deposited on layer 22. A similar electrically conductive material is deposited on the bottom of the material to form a bottom electrode 24.

If desired or deemed necessary an epitaxial optical buffer layer 25, as indicated by the dash lines, may be deposited on the substrate before deposition of the waveguide layer to minimize optical losses. The lengthwise cleaved edges of the modulator retain the light energy within the body of material, while the end cleaved faces form the entrance and exit surfaces for light energy.

In use, a modulator fabricated as taught by the process of the present invention, and as illustrated in FIG. 2, requires polarized light input and a polarization sensitive means at the exit face. The speed of the modulator as illustrated in FIG. 2 is limited by the area and thickness of the epitaxial layer. Its capitance is determined by $$c = \epsilon A/t = \epsilon \frac{lw}{t}$$

where $\epsilon$ is the dielectric permittivity of the waveguide layer, $l$ is the length, $w$ is the width, and $t$ is the thickness of the active layer.

For ZnSe epitaxy 10 $\mu$m thick on a low resistivity GaAs substrate having dimensions of 1 cm × 0.1mm (approximately 0.5 inch × 0.004 inch), the capacitance is about 7 pf. Using a 50 ohm load, the pulse rise time of this device will be about 1 $n$ sec, enabling it to operate at 500 MHz to 1 GHz. The voltage required for operation will be less than 15V.

Those knowledgable and skilled in the pertinent arts will appreciate that the process and method of manufacture conceived by the present invention provides cleavable electro-optical epitaxial layers producing modulators with great ease of fabrication and very low cost. In addition, the concept of the present invention has a desirably broad application as a method of manufacture and fabrication since it may be used with many combinations of different materials.

Obviously many modifications and variations of the present invention are possible in the light of the above teachings. It is therefore to be understood that within the scope of the appended claims the invention may be practiced otherwise than as specifically described.

What is claimed is:

1. A method of fabricating high-efficiency, semi-planar, electro-optic modulators comprising the steps of:
   depositing an electro-optically responsive epitaxial waveguiding layer of material transparent to known wavelengths of light energy on a low resistivity single crystal substrate;
   depositing an optical buffer material on said epitaxial waveguiding material, said optical buffer material having a lower index of refraction than said epitaxial waveguiding material;
   depositing a first electrode on said optical buffer material;
   depositing a second electrode on the bottom of said substrate;
   determining the natural cleavage plane of the substrate;
   aligning the composite material in a scribing means for scribing said substrate parallel to the natural cleavage plane of the substrate;
   scribing said substrate for cleaving said composite material in situ along two widely spaced parallel lines defining the entrance and exit faces of a plurality of modulators; and
   scribing multiple closely spaced parallel lines at 90° to the widely spaced parallel lines for cleaving said composite material in situ, completing the formation of a plurality of modulators.

2. A method of fabricating a high-efficiency, semi-planar, electro-optic modulator as claimed in claim 1 including the step of removing a portion of the back of the substrate to reduce its thickness to a dimension which will cleave readily.

3. A method of fabricating a high-efficiency, semi-planar electro-optic modulator as claimed in claim 1 including the step of selecting a substrate from the III–V compounds.

4. A method of fabricating a high-efficiency, semi-planar, electro-optic modulator as claimed in claim 1 including the step of selecting a substrate from the II–VI compounds.

5. A method of fabricating a high-efficiency, semi-planar, electro-optic modulator as claimed in claim 1 wherein said substrate is comprised of germanium.

6. A method of fabricating a high efficiency, semi-planar, electro-optic modulator as claimed in claim 1 wherein said substrate is comprised of silicon.

7. A method of fabricating a high-efficiency, semi-planar, electro-optic modulator as claimed in claim 1 wherein said substrate is CdS.

8. A method of fabricating a high-efficiency, semi-planar, electro-optic modulator as claimed in claim 7 including the step of heating the CdS substrate in saturated cadmium vapor to reduce its resistivity.

9. A method of fabricating a high-efficiency, semi-planar, electro-optic modulator as claimed in claim 1 wherein said substrate is ZnSe.

10. A method of fabricating a high-efficiency, semi planar, electro-optic modulator as claimed in claim 9 including the step of submerging the ZnSe substrate in molten zinc to reduce its resistivity.

* * * * *